5 Sheets—Sheet 1.

J. F. FAHS, A. C. BELDEN & F. W. KREMER.
Oatmeal Machine.

No. 234,010.        Patented Nov. 2, 1880.

Witnesses:
F. Thomason
[signature]

Inventors
Joseph F. Fahs.
Albert C. Belden
Frank W. Kremer
by their Attorney Wm H. Finckel J. F. FAHS, A. C. BELDEN & F. W. KREMER.
Oatmeal Machine.

No. 234,010.     Patented Nov. 2, 1880.

5 Sheets—Sheet 3.

J. F. FAHS, A. C. BELDEN & F. W. KREMER.
Oatmeal Machine.

No. 234,010.          Patented Nov. 2, 1880.

5 Sheets—Sheet 4.
J. F. FAHS, A. C. BELDEN & F. W. KREMER.
Oatmeal Machine.
No. 234,010. Patented Nov. 2, 1880.
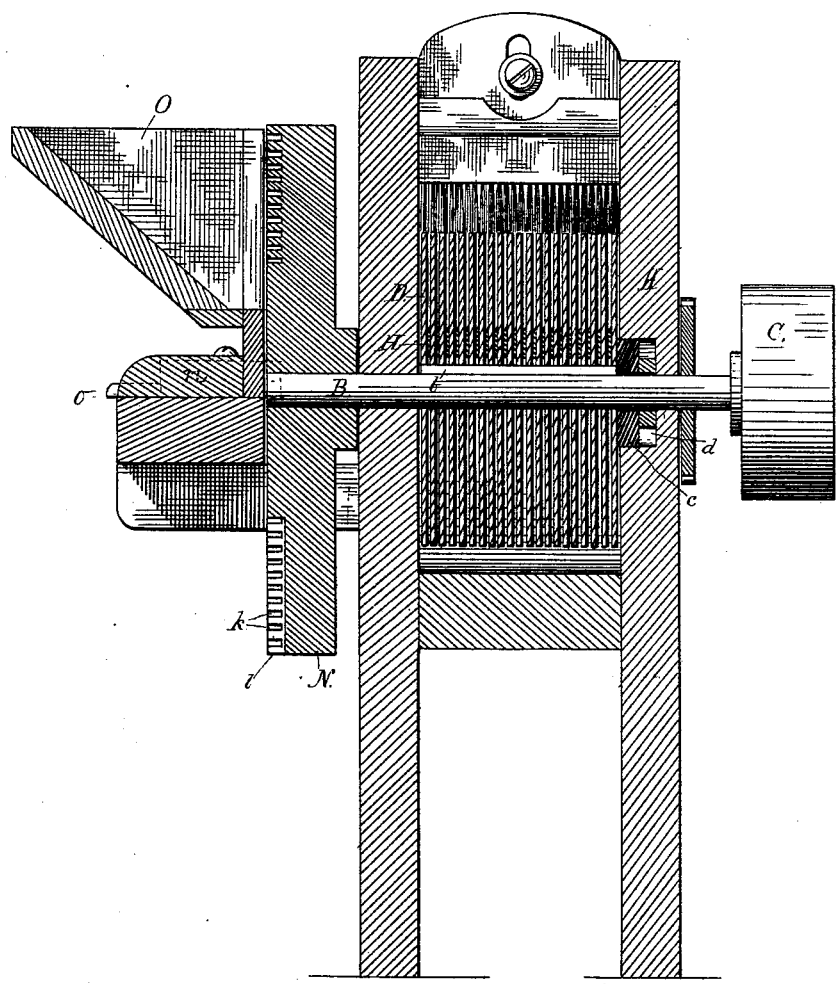

5 Sheets—Sheet 5.
J. F. FAHS, A. C. BELDEN & F. W. KREMER.
Oatmeal Machine.
No. 234,010. Patented Nov. 2, 1880.
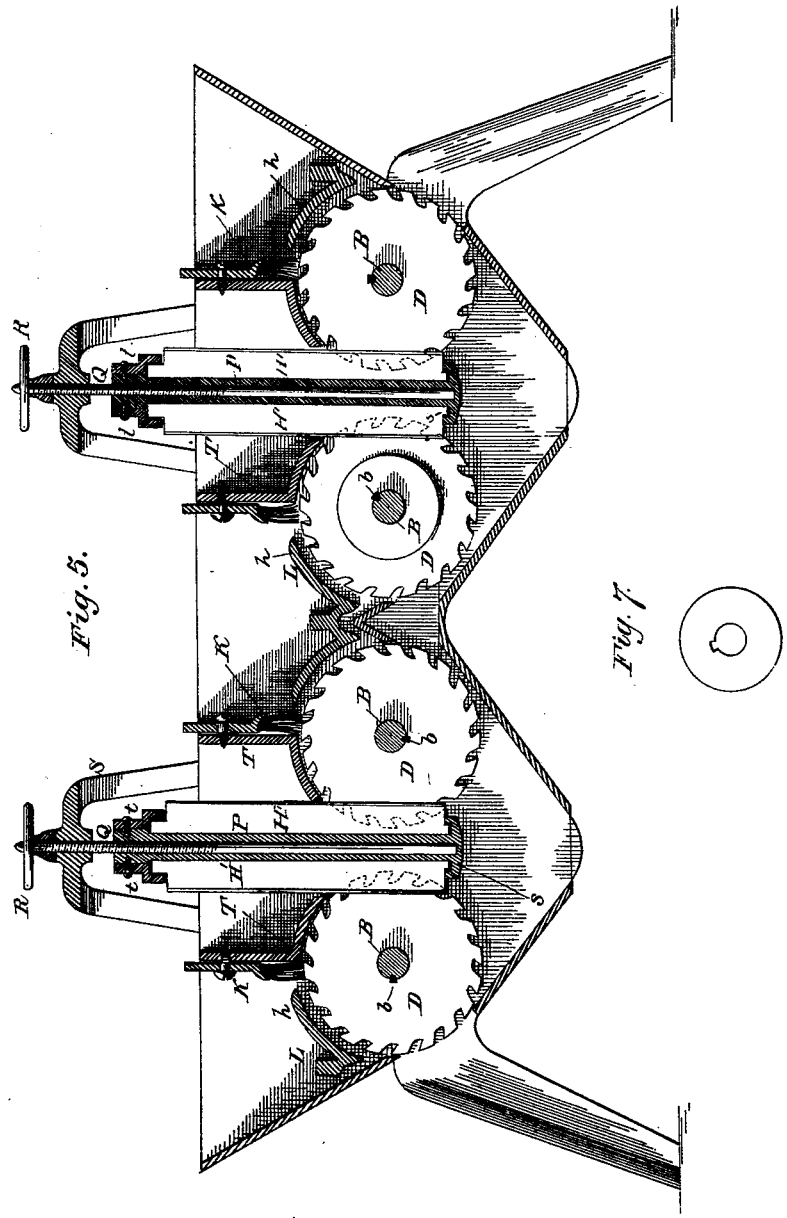

UNITED STATES PATENT OFFICE.

JOSEPH F. FAHS, ALBERT C. BELDEN, AND FRANK W. KREMER, OF AKRON, OHIO; SAID BELDEN AND KREMER ASSIGNORS OF ONE-TWELFTH EACH OF THEIR RIGHT TO SAID FAHS.

OATMEAL-MACHINE.

SPECIFICATION forming part of Letters Patent No. 234,010, dated November 2, 1880.

Application filed January 15, 1880.

*To all whom it may concern:*

Be it known that we, JOSEPH F. FAHS, ALBERT C. BELDEN, and FRANK W. KREMER, all of Akron, in the county of Summit, in the State of Ohio, have invented certain new and useful Improvements in Oatmeal-Machines, of which the following is a specification.

Our invention relates to improvements in rotary machines for cutting oats into fragments, or making what is commonly known as "oatmeal;" and the invention consists in a framing, a hopper, a discharge-chute, and a feeder composed of radially or tangentially grooved disks keyed to a shaft and rotated about fixed adjustable knives, which aid in separating said disks, and the oats to be cut being fed to said knives, as hereinafter specified and claimed.

Figure 1:
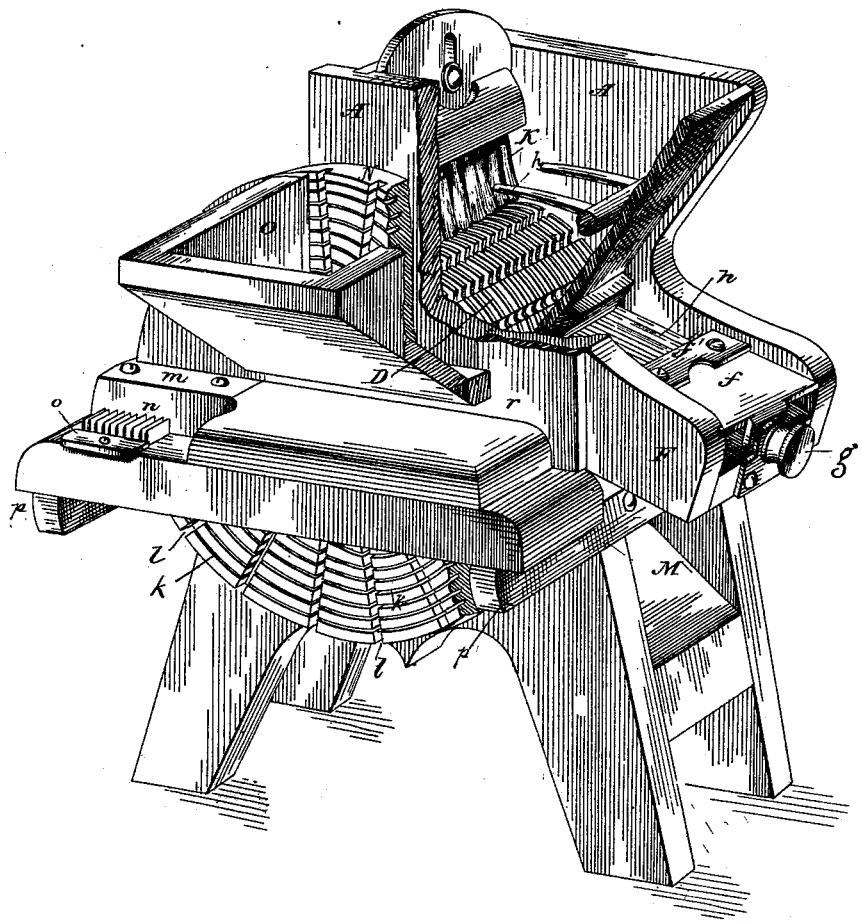
Figure 2:
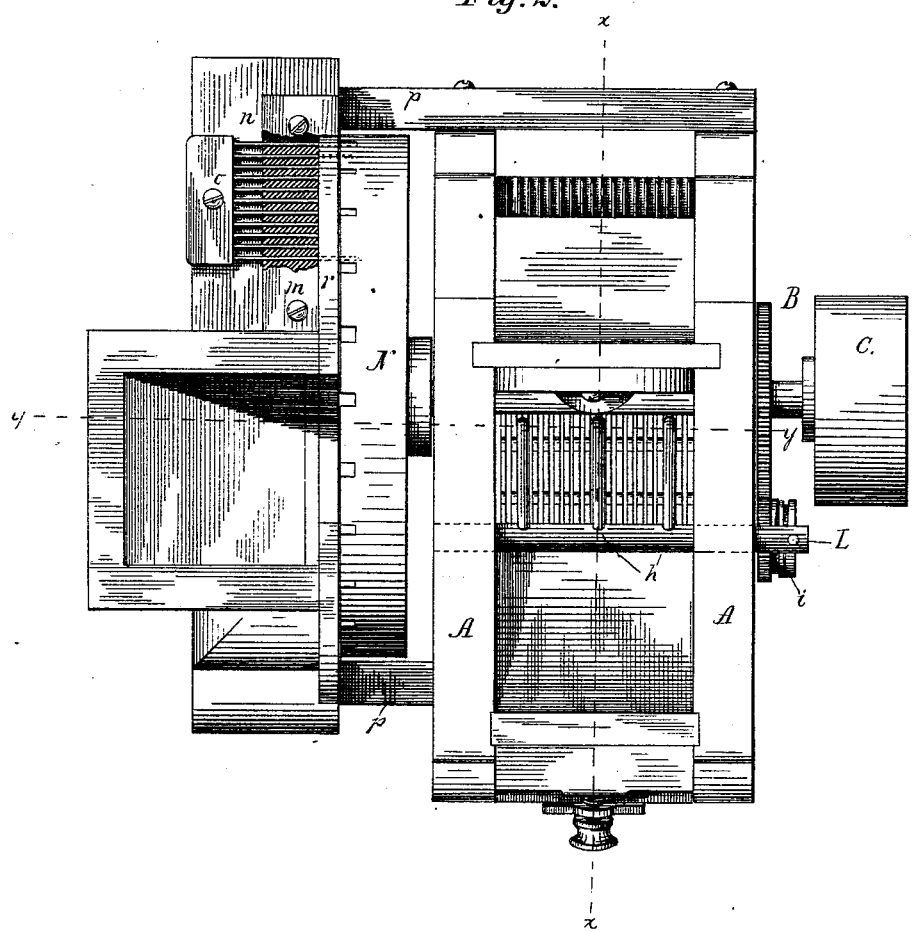
Figure 3:
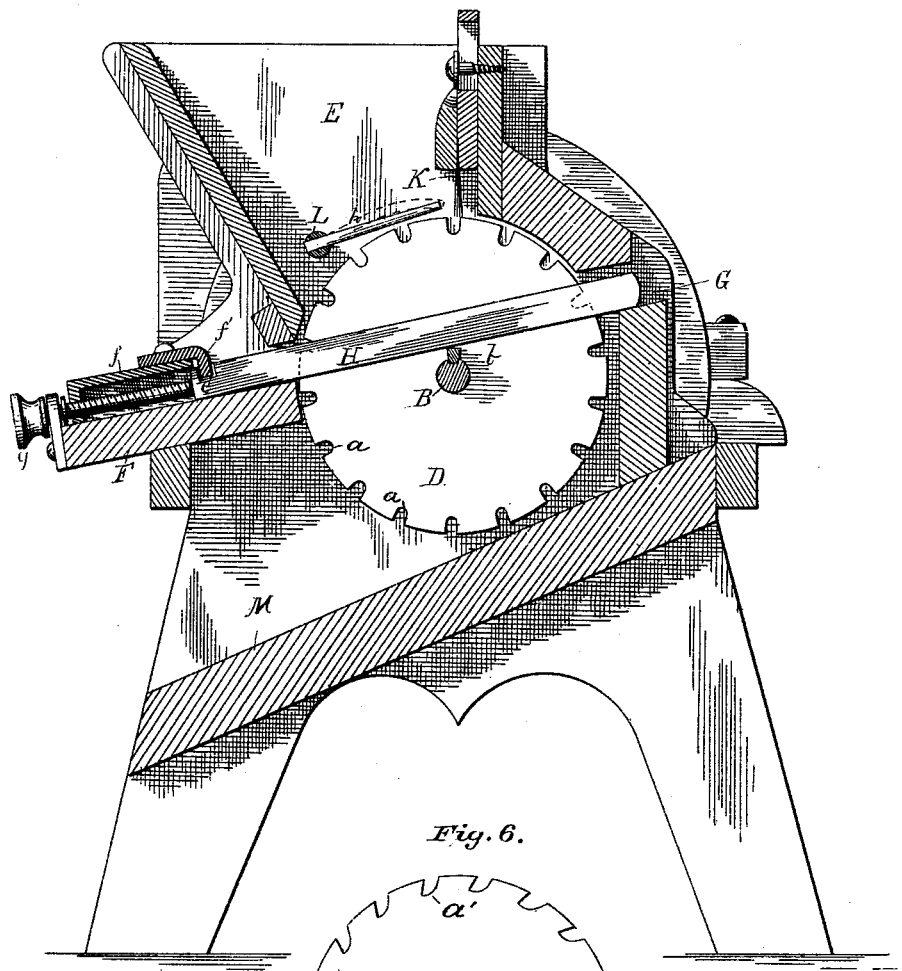
Figure 6:
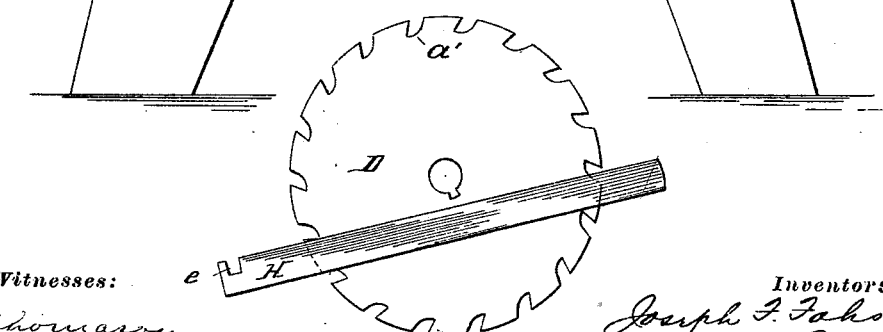

Referring to the drawings herewith, illustrating our invention, in the several figures of which corresponding parts are similarly designated, Figure 1 is a perspective view. Fig. 2 is a top-plan view. Fig. 3 is a longitudinal vertical section on line $x\ x$ of Fig. 2. Fig. 4 is a transverse vertical section on line $y\ y$ of Fig. 2. Fig. 5 is a longitudinal vertical section of a gang of our machines, illustrating, also, several modifications. Fig. 6 is a side elevation of a modified form of feed-disk and mode of arranging the knife. Fig. 7 is a side elevation of a washer that may be employed to separate or aid the knives in separating the feed-disks.

Any suitable framing, A, may be employed, in which is supported a driving-shaft, B, with power-connection C. Upon the shaft B are placed disks D, having notches or grooves in their peripheries, which notches or grooves may be radial, as at $a$, Fig. 3, or tangential, as at $a'$, Fig. 6. These disks are cut from steel plate by suitable stamps or dies, and tempered, and are secured rigidly to shaft B by a key, spline, or feather, $b$, in such manner that their grooves or notches shall align to form continuous grooves across the width of the disks on the shaft. The series of disks D form a grooved feeder, taking the grain from the hopper E. When the requisite number of disks have been placed upon the shaft a rubber or other spring, $c$, Fig. 4, is placed against the outermost one and secured by a nut, $d$, the purpose of which will presently appear.

The framing A is provided with a preferably inclined end bed, F, and an adjacent inclined cross or end piece, G, which form supports for the knives or cutters H. These knives are made of thin sheet or plate steel, and have beveled edges or cutting-surfaces, as shown in Fig. 4, and notched ends $e$. The knives are arranged between the disks, above their shaft, as in Figs. 3 and 4, or below such shaft, as in Fig. 6, and follow the incline of their supports F G. These knives are secured in place by a divided hooked plate, $f\ f'$, engaging with their notched ends $e$ and a set-screw, $g$, by which latter said knives are adjusted longitudinally with relation to the disks, so as to present new cutting-surfaces as they wear away. The portion $f'$ is removable to permit the removal of the knives. These knives, being arranged between the disks, separate them after the manner of washers, and take the place of washers. The knives should be of such thickness only as to prevent the oats falling between the disks. As the knives are worn thin the spring $c$ takes up the slack, and so keeps the disks and knives well together. The bevel of the cutting-edge of the knives is such as to bear against the disks and insure a perfect square cut.

The alignment of notches forms grooves, as before stated, which grooves only permit the grain to lie therein and be fed to the knives in a position parallel with the shaft and at right angles to the knives. These grooves are not of sufficient depth to permit the grain to remain in a perpendicular position or at right angles to the shaft, but are so arranged as to insure the transverse division rather than longitudinal division of the kernels. The length of the cut pieces is proportioned to the thickness of the disks.

The disks, it will be understood, may be readily removed from the shaft when damaged, and replaced by new ones at small cost.

K is a brush adjustable with relation to the disks by means of a slot and screw, or otherwise, and arranged in the hopper over the feeder-disks, to prevent the grain from filling the notches so full as to crowd against the casing and be crushed.

L is a reciprocating bar arranged in the hopper at a suitable distance above the feeder-disks, so as not to crush or injure the grain, and having fingers $h$ projecting nearly horizontally therefrom, said bar in the instance here given deriving its motion from a cam, $i$, geared with the driving-shaft B. This reciprocating bar we designate a "leveler," inasmuch as the movement of its fingers across the feeder-disks throws any upright grain or such as may stand on its points or ends longitudinally into the grooves therein.

As shown in Fig. 1 and in dotted lines Fig. 3, the fingers $h$ of the leveler may be curved to conform to the curvature of the disks, and so as to work so closely to the disks as to insure the throwing of the kernels lengthwise into the grooves without crushing them.

It will be understood from the foregoing that in operation the grain descends from the hopper into the grooved feeder-disks, and such feeder-disks, being rotated, carry the grain against the knives, whereby it is cut, and when so cut, by the further revolution of the feeder-disks, such grain is dropped into the discharge-chute M.

To increase the capacity of this machine there may be attached to the shaft B a vertically-revolving disk, N, having in its face a number of narrow concentric grooves, $k$, and radial grooves $l$, these last being sufficiently wide and deep to contain oats, the oats being fed thereto from a hopper, O.

$m$ is a grooved bar, in which are adjustably held a number of knives, $n$, corresponding in width and number with the concentric grooves $k$ of the disk N, and entering said concentric grooves freely, being adjustably held up into said grooves by a plate, $o$, set and adjusted by suitable means, as a thumb or set screw. The rotation of disk N brings the grain longitudinally to the knives $n$ in its radial grooves $l$, whereby the grain is cut, as before. This mechanism may be, and preferably is, mounted upon an independent frame, which may, by arms $p\ p$, be easily attached to or removed from the machine first described. In this last-described form of machine the hopper is located at the face of the disk, as shown. The knives are secured in the knife-bar $m$, which is removably attached to the frame, so that when the knives require sharpening the bar may be replaced by a similar one provided with knives, in order that no time may be lost. The grain is held in the radial grooves by the face-plate $r$ and the knife-bar, and the cut grain or oatmeal is discharged at the lower side of the knife-bar.

Another mode of increasing the capacity of our machine is as follows: Two or more shafts with feeder-disks may be geared together in a train or gang, as shown in Fig. 5. It would be preferable in such a machine or gang to separate the disks on the shaft by washers such as shown in Fig. 7, the diameter of such washers being so small as that such washers will not interfere with the knives or the notches or grooves in the disks, and the thickness of such washers being uniform with the knives. By the use of the washers in this form of machine the disks are held against wabbling, and rotate truly and uniformly. The knives H' in the gang-machine are secured to vertically-adjustable frames P, on either side thereof, by laterally-extending socket-plates $s$ at the bottom and removable clamp-plates $t$ at the top of said frames, the feeder-disks and knives being arranged in pairs, as shown. The frames with their knives extend down between the pairs of feeder-disks, and are supported from brackets S by means of screw-rods Q, which rods are operated by hand-wheels R, to raise and lower the frames, to adjust the knives, and present new sharp edges to the feeder-disks to act upon the grain.

It will be understood that the knives extend between the disks, and said disks bring the grain to such knives, which cut them with a draw-cut. These knives can be made of any desired length, the longer the better, as they can be used for a correspondingly-greater length of time without sharpening. Thus a knife one foot long, having only one-eighth of an inch of its edge in use at a time, could be used ninety-six times as long as a stationary knife without regrinding. The knives are inserted and removed very readily by loosening the clamp-plates $t$. That portion of the disks between the hopper and the knives is covered by a plate, T, so as to hold the grain in a rigid position and prevent its jumping from the grooves before being cut. This machine is provided with brushes K and fingered reciprocating bars or levelers L, as before described.

Our improvements possess the advantages of simplicity of construction, facility with which the parts most exposed to wear can be adjusted or replaced, accessibility of parts, automatic feed, positive action, not requiring the constant attention of skilled labor, and impossibility of clogging.

We are aware that a longitudinally and transversely grooved feeder for oatmeal-machines is old; also, that such a feeder, in combination with cutters entering the transverse grooves, is old; also, that notched disks arranged on a shaft, and having an adjustable rotary cutter-shaft with circular plates or cutters entering between such disks, are old, the cutters, however, not aiding in holding the disks apart.

We do not claim the combination of a rotary grooved and slitted feed-roll with a series of stationary smooth-edge knives, so arranged with reference to the feed-roll that the edges of the knives and the surface of the roll gradually converge.

What we claim as our invention, and desire to secure by Letters Patent, is—

1. The combination of a rotary shaft, feeder-disks keyed thereon, and knives or cutters fitting closely between and aiding in separating such disks, substantially as described.

2. In an oatmeal-machine, the combination of a rotary shaft, feeder-disks keyed thereon, fixed adjustable knives extending in closely between the disks to aid in separating them, and substantially horizontal reciprocating leveling-fingers arranged above and overlying the disks, to insure the proper feeding of the grain, substantially as specified.

3. In an oatmeal-machine, the combination, with a grooved feeder, of a reciprocating bar having substantially horizontal leveling-fingers arranged above and overlying the feeder, to insure the proper feeding of the grain lengthwise into the grooves of said feeder, substantially as specified.

To the above specification of our invention we have signed our names this 13th day of January, A. D. 1880.

J. F. FAHS.
     A. C. BELDEN.
     F. W. KREMER.

In presence of—
 N. C. BARTON,
 WALTER UPINGTON.